United States Patent
Delaporte

(10) Patent No.: US 12,079,052 B2
(45) Date of Patent: Sep. 3, 2024

(54) POWER GENERATION THROUGH A FOLDABLE MOBILE DEVICE HINGE FORCE INPUT

(71) Applicant: Lepton Computing LLC, Brooklyn, NY (US)

(72) Inventor: Stephen E. Delaporte, Brooklyn, NY (US)

(73) Assignee: LEPTON COMPUTING LLC, Brooklyn, NY (US)

( * ) Notice: Subject to any disclaimer, the term of this patent is extended or adjusted under 35 U.S.C. 154(b) by 145 days.

(21) Appl. No.: 17/521,841

(22) Filed: Nov. 8, 2021

(65) Prior Publication Data

US 2022/0197356 A1    Jun. 23, 2022

Related U.S. Application Data

(60) Provisional application No. 63/111,050, filed on Nov. 8, 2020.

(51) Int. Cl.

| G06F 1/00 | (2006.01) |
|---|---|
| G06F 1/16 | (2006.01) |
| G06F 1/26 | (2006.01) |
| G06F 3/041 | (2006.01) |
| H02J 15/00 | (2006.01) |

(Continued)

(52) U.S. Cl.
CPC .............. *G06F 1/26* (2013.01); *G06F 1/1616* (2013.01); *G06F 1/1652* (2013.01); *G06F 1/1681* (2013.01); *G06F 3/0412* (2013.01); *H02J 15/007* (2020.01); *H02J 50/005* (2020.01); *H02J 50/10* (2016.02)

(58) Field of Classification Search
CPC ........................................................ G06F 1/26
See application file for complete search history.

(56) References Cited

U.S. PATENT DOCUMENTS

| 7,425,807 B1 * | 9/2008 | Perkins | H02K 7/025 322/4 |
|---|---|---|---|
| 7,643,855 B2 * | 1/2010 | Iwama | H04B 7/084 455/571 |

(Continued)

*Primary Examiner* — Mohammed H Rehman
(74) *Attorney, Agent, or Firm* — ArentFox Schiff LLP; Joseph M. Maraia

(57) ABSTRACT

A foldable touch screen display device made up of flexible or tiled display segments that can be folded from a compact state to an expanded state which also includes a power generation system. The form factor of the compact state is roughly the size of a typical handheld phone or smaller. The form factor of the expanded state is roughly the size of a larger phone or tablet computer, which may also include the mechanical functionality of a laptop. The device form factor may also be a flip phone configuration. Both folded states may include an integrated speaker and microphone. The power generation system utilizes the force applied to the hinge of the device to ultimately recharge the batteries embedded within the device. The device may further include sensors to indicate the position of each display segment. In one embodiment, a module attached to, situated within, or otherwise associated with at least one segment of the flexible display or rigid display may contain all or substantially all processing and memory, along with a communications system, which may be used in any folded state.

17 Claims, 2 Drawing Sheets

(51) Int. Cl.
*H02J 50/00* (2016.01)
*H02J 50/10* (2016.01)

(56) References Cited

U.S. PATENT DOCUMENTS

| | | | |
|---|---|---|---|
| 2004/0136156 A1* | 7/2004 | Nakamura | G06F 1/1637 |
| | | | 361/679.27 |
| 2005/0057555 A1* | 3/2005 | Nakamura | H01M 8/04216 |
| | | | 345/211 |
| 2011/0043995 A1* | 2/2011 | Chen | G06F 1/203 |
| | | | 361/679.55 |
| 2016/0208545 A1* | 7/2016 | Baba | E06B 7/30 |
| 2017/0002586 A1* | 1/2017 | Lee | E05B 39/00 |
| 2019/0193987 A1* | 6/2019 | Putkinen | B66B 1/46 |
| 2022/0214852 A1* | 7/2022 | Kim | G09F 9/30 |

\* cited by examiner

POWER GENERATION THROUGH A FOLDABLE MOBILE DEVICE HINGE FORCE INPUT

CROSS REFERENCE TO RELATED APPLICATIONS

This application claims the benefit of U.S. Provisional Patent Application No. 63/111,050, filed on Nov. 8, 2020, which is incorporated in its entirety herein by reference.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic intensive applications, and reading text. The rigid nature of a standard touch screen display can also limit the portability of a device when its form factor is in the larger size range for a phone, or at the scale of a tablet, which makes folding a desirable feature. Additionally, because a foldable device fundamentally has a hinge mechanism built in that requires constant force input to open and close the device, this mechanical energy could be translated and utilized for other mechanical and hardware functions.

There is therefore a need for touch screen display devices that can be adjusted in size without sacrificing the convenience of being small and handheld. There is also a need for a power generation system that can utilize the inherent hinge mechanics of a foldable device such that when a force is applied to the hinge of the device, that mechanical energy can then be translated to a generator to ultimately recharge the batteries embedded within the device.

SUMMARY OF EMBODIMENTS OF THE INVENTION

A foldable touch screen display device made up of flexible or tiled display segments that can be folded from a compact state to an expanded state which also includes a power generation system. The form factor of the compact state is roughly the size of a typical handheld phone or smaller. The form factor of the expanded state is roughly the size of a larger phone or tablet computer, which may also include the mechanical functionality of a laptop. The device form factor may also be a flip phone configuration. Both folded states may include an integrated speaker and microphone. The power generation system utilizes the force applied to the hinge of the device to ultimately recharge the batteries embedded within the device. The device may further include sensors to indicate the position of each display segment. In one embodiment, a module attached to, situated within, or otherwise associated with at least one segment of the flexible display or rigid display may contain all or substantially all processing and memory, along with a communications system, which may be used in any folded state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
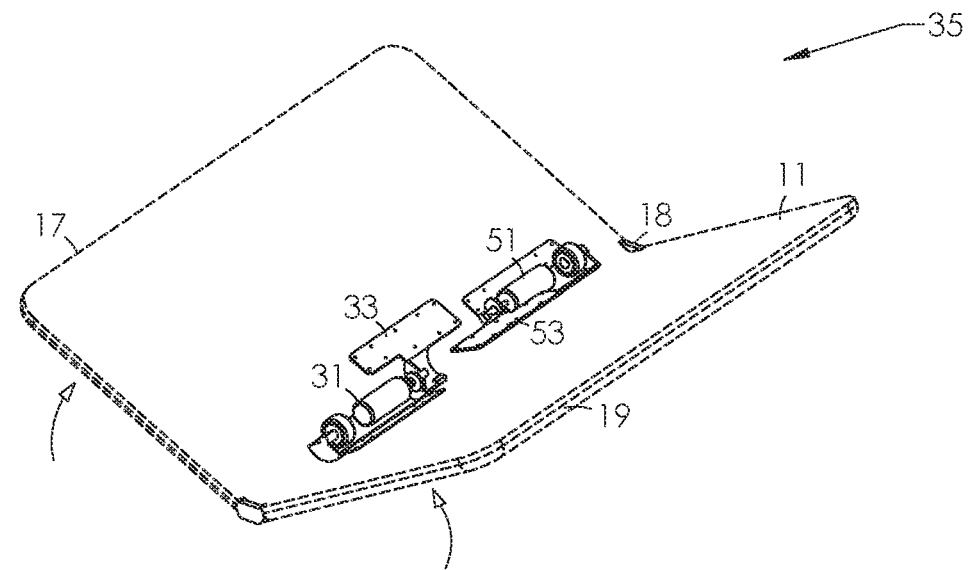
FIG. 1 is a perspective view of a foldable computing device shown in two separate positions where the internal power generator system is shown coupled to the central hinge mechanism.
Figure 1:
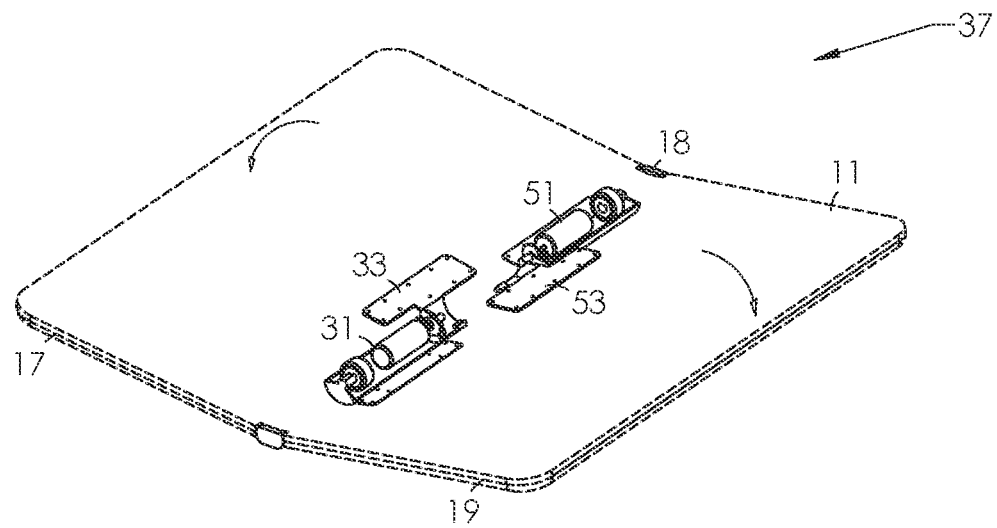

In accordance with the exemplary embodiment shown in FIG. 1, a foldable computing device 11 has two display segments 17 and 19, that are shown folding against each other in the first position 35, and then folding outward to a flat open state in position 37. In position 35, a first power generator 51 is shown coupled to the central hinge 18 that sits between display segments 17 and 19. The output arm 53 is coupled to one segment so that the closing force can be translated to power generator 51. The power generator system can be made up of a motor or another configuration of coil and magnets to generate power from, and a gearing configuration can also be integrated such that it can output a plurality of revolutions translated from one single rotational force of the device closing. The output force after the gear train, can also be integrated with a fly wheel so that power can continue to be generated after the device has been folded to a fully folded or open position. A second power generator 31 and its output arm 33 may also be included so that the mechanical energy from opening the device can still be translated by its second power generator 31 while power generator 51, which is activated through the closing force, continues to spin and generate power through electromagnetic induction as one primary method. A ratchet mechanism allows each power generator to translate the hinge force in one rotational direction, this way when the device is being closed, it can activate the gear train and fly wheel only from that rotational folding direction of the device, and then disengage with the gear train when being rotated in the opposite direction. Similarly, as the device is being opened, a different ratchet engages with a second gear train and fly wheel so that the mechanical energy is being utilized and translated to power generators when the device is being opened or closed. A foldable mobile device can also be configured with just one power generator system such that the ratchet, gear train, and flywheel are only activated when the device is folded either to an open state or to a closed state, while for the other direction of folding, the ratchet would be disengaged. Another alternative configuration would include a single power generator, but with two ratchet and gear trains that would each engage with the flywheel. When the device is being opened, a ratchet and a gear train corresponding to the opening rotational direction can be engaged to rotate the flywheel, while a second set of ratchet and gear train corresponding to the device's closing rotational direction, can continue to rotate the same flywheel and power generator that it's attached to.

If a ratchet or a similar functioning mechanism wasn't integrated, the power generator would be forced to stop rotating as soon as the device folds from the opening rotational direction to the closing rotational direction and vice versa, and it would then be forced to spin in the opposite direction each time it rotates from closed to opened state, which would be inefficient with regard to translating the mechanical rotational energy to the power generator in the most optimized way possible. It is important to note that the power generator system can also be disengaged from the drive mechanism connected to the device. This would be desirable when the required force to open and close the device is minimal since the power generator would require more force from the user to open and close the device. It should also be noted that a connection structure needs to be affixed to the rotor of the power generator and one of the device's structural support segments while a second connection structure needs to be affixed to the stator of the power generator and the opposing structural support segment of the device for the mechanical force to be most efficiently translated whether or not a gearing system is integrated.

Figure 2:
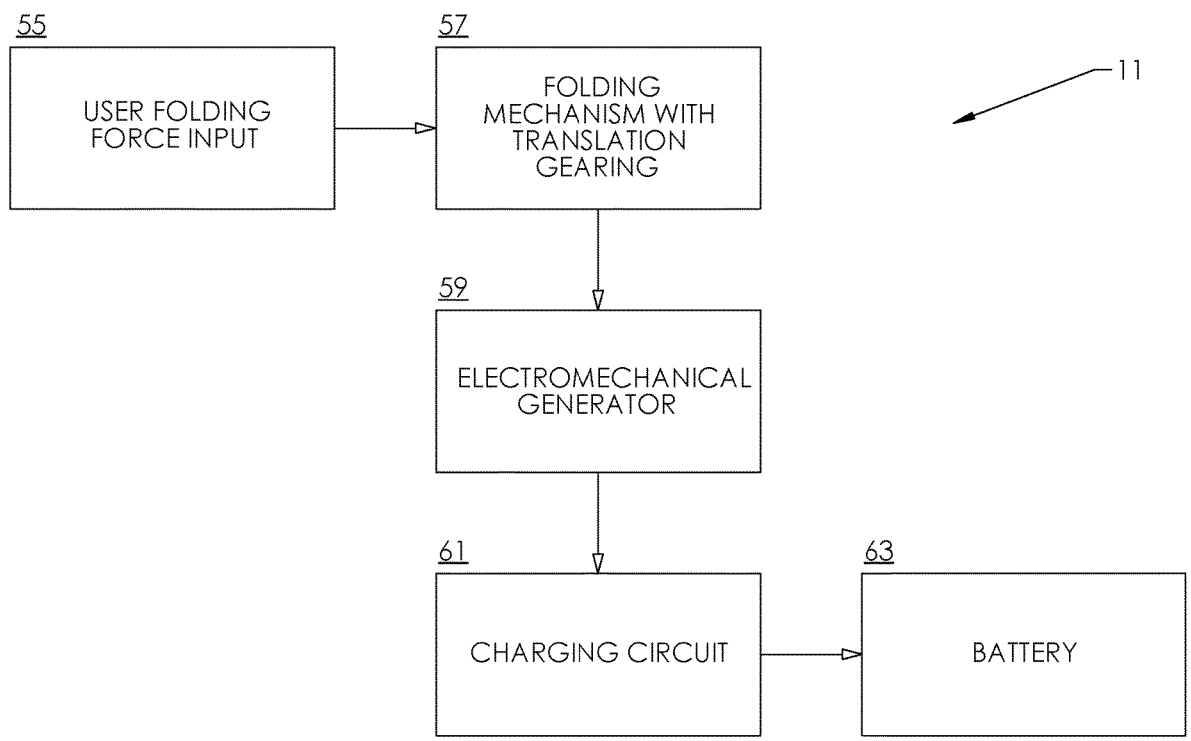
FIG. 2 is a block diagram showing the basic system components for a power generator system embedded within a foldable computing device.

FIG. 2 shows a block diagram of the basic mechanical and electronic system components needed for an embedded power generator to work within a foldable computing device. A user's folding input force 55 is first required to introduce mechanical energy which is then translated to the foldable mobile device's folding mechanism with translation gearing 57 as the device is folded. The electromechanical generator 59 then takes the mechanical force from the translation gearing 57 to generate power using a motor or another configuration of coils and magnets. From there, the electricity created from electromechanical generator 59 is run into a battery charging circuit 61, and from there to the battery. This system could also be a standalone hardware system that attaches to the device utilizing a similar mechanical configuration to charge the battery internal to the device or a backup battery external to the device.

While certain features of the invention have been illustrated and described herein, many modifications, substitutions, changes, and equivalents will now occur to those of ordinary skill in the art. It is, therefore, to be understood that the appended claims are intended to cover any such modifications and changes that fall within the true spirit of the invention.

What is claimed is:

1. An apparatus comprising:
    (a) a flexible touch-sensitive display composed of a first flexible touch-sensitive display portion and a second flexible touch-sensitive display portion; wherein:
        (1) the first flexible touch-sensitive display portion is attached to a first structural support segment;
        (2) the second flexible touch-sensitive display portion is attached to a second structural support segment;
        (3) the flexible touch-sensitive display further comprises having a fully folded state;
        (4) the flexible touch-sensitive display further comprises having a partially expanded state;
        (5) the flexible touch-sensitive display further comprises having a fully expanded state;
    (b) a power generator configured and attached to each structural support segment such that a closing folding motion and an opening folding motion of the apparatus provides a mechanical input force through a ratchet mechanism that engages with at least one folding motion to activate the power generator which in turn creates electric power for charging a battery.

2. The apparatus of claim 1 wherein:
the power generator includes a chassis with a first connecting structure affixed to both the rotor assembly of the power generator and the first flexible touch-sensitive display structural support segment; and a second connecting structure affixed to the stator assembly of the power generator and the second flexible touch-sensitive display structural support segment.

3. The apparatus of claim 1 wherein:
the power generator includes a gearing system connected to its rotor assembly input such that the gearing can translate the closing folding motion or the opening folding motion of the apparatus to a plurality of rotations for optimizing power generation.

4. The apparatus of claim 1 wherein:
the power generator includes a flywheel assembly for optimizing power generation.

5. The apparatus of claim 1 wherein:
the power generator utilizes electromagnetic induction to generate power.

6. The apparatus of claim 1 wherein:
the fully folded state comprises a fully folded angle between the first flexible touch-sensitive display component and the second flexible touch-sensitive display component that is less than 10 degrees; and
the fully expanded state comprises a fully expanded angle between the first flexible touch-sensitive display component and the second flexible touch-sensitive display component that is between 170 and 190 degrees; and
the partially expanded state comprises an angle that falls between the fully folded state and the fully expanded state.

7. An apparatus comprising:
(a) a rigid touch-sensitive display;
(b) a flexible touch-sensitive display composed of a first flexible touch-sensitive display portion and a second flexible touch-sensitive display portion; wherein:
  (1) the first flexible touch-sensitive display portion is attached to a first structural support segment;
  (2) the second flexible touch-sensitive display portion is attached to a second structural support segment;
  (3) the flexible touch-sensitive display further comprises having a fully folded state;
  (4) the flexible touch-sensitive display further comprises having a partially expanded state;
  (5) the flexible touch-sensitive display further comprises having a fully expanded state;
(b) a power generator configured and attached to each structural support segment such that a closing folding motion and an opening folding motion of the apparatus provides a mechanical input force through a ratchet mechanism that engages with at least one folding motion to activate the power generator which in turn creates electric power for charging a battery.

8. The apparatus of claim 7 wherein:
the power generator includes a chassis with a first connecting structure affixed to both the rotor assembly of the power generator and the first flexible touch-sensitive display structural support segment; and a second connecting structure affixed to the stator assembly of the power generator and the second flexible touch-sensitive display structural support segment.

9. The apparatus of claim 7 wherein:
the power generator includes a gearing system connected to its rotor assembly input such that the gearing can translate the closing folding motion or the opening folding motion of the apparatus to a plurality of rotations for optimizing power generation.

10. The apparatus of claim 7 wherein:
the power generator includes a flywheel assembly for optimizing power generation.

11. The apparatus of claim 7 wherein:
the power generator utilizes electromagnetic induction to generate power.

12. The apparatus of claim 7 wherein:
the fully folded state comprises a fully folded angle between the first flexible touch-sensitive display component and the second flexible touch-sensitive display component that is less than 10 degrees; and
the fully expanded state comprises a fully expanded angle between the first flexible touch-sensitive display component and the second flexible touch-sensitive display component that is between 170 and 190 degrees; and
the partially expanded state comprises an angle that falls between the fully folded state and the fully expanded state.

13. An apparatus comprising:
(a) a first touch-sensitive display and a second touch-sensitive display; wherein:
  (1) the first touch-sensitive display is attached to a first structural support segment;
  (2) the second touch-sensitive display is attached to a second structural support segment;
  (3) the touch-sensitive displays further comprise having a fully folded state;
  (4) the touch-sensitive displays further comprise having a partially expanded state;
  (5) the touch-sensitive displays further comprise having a fully expanded state;
(b) a power generator configured and attached to each structural support segment such that a closing folding motion and an opening folding motion of the apparatus provides a mechanical input force through a ratchet mechanism that engages with at least one folding motion to activate the power generator which in turn creates electric power for charging a battery.

14. The apparatus of claim 13 wherein:
the power generator has a chassis with a first connecting structure affixed to both the rotor assembly of the power generator and the first touch-sensitive display structural support segment; and a second connecting structure affixed to the stator assembly of the power generator and the second touch-sensitive display structural support segment.

15. The apparatus of claim 11 wherein:
the power generator includes a gearing system connected to its rotor assembly input such that the gearing can translate the closing folding motion or the opening folding motion of the apparatus to a plurality of rotations for optimizing power generation.

16. The apparatus of claim 13 wherein:
the power generator includes a flywheel assembly for optimizing power generation.

17. The apparatus of claim 13 wherein:
the power generator utilizes electromagnetic induction to generate power.

* * * * *